US010196501B2

(12) United States Patent
Hanawa et al.

(10) Patent No.: US 10,196,501 B2
(45) Date of Patent: Feb. 5, 2019

(54) POLYMERIZABLE COMPOSITION FOR OPTICAL MATERIAL, OPTICAL MATERIAL PRODUCED FROM SAME, AND PROCESS FOR PRODUCING SAME

(71) Applicant: MITSUI CHEMICALS, INC., Minato-ku, Tokyo (JP)

(72) Inventors: Takayuki Hanawa, Omuta (JP); Shigetoshi Kuma, Kurume (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

(21) Appl. No.: 15/305,934

(22) PCT Filed: Apr. 30, 2015

(86) PCT No.: PCT/JP2015/062933
§ 371 (c)(1),
(2) Date: Oct. 21, 2016

(87) PCT Pub. No.: WO2015/166975
PCT Pub. Date: Nov. 5, 2015

(65) Prior Publication Data
US 2017/0051131 A1 Feb. 23, 2017

(30) Foreign Application Priority Data
May 2, 2014 (JP) .................. 2014-095491

(51) Int. Cl.
| C08K 5/521 | (2006.01) |
| G02C 7/02 | (2006.01) |
| G02B 1/04 | (2006.01) |
| B29D 11/00 | (2006.01) |
| C08G 18/24 | (2006.01) |
| C08G 18/38 | (2006.01) |
| C08L 75/04 | (2006.01) |
| C08G 18/75 | (2006.01) |

(52) U.S. Cl.
CPC ........ *C08K 5/521* (2013.01); *B29D 11/00442* (2013.01); *C08G 18/24* (2013.01); *C08G 18/242* (2013.01); *C08G 18/38* (2013.01); *C08G 18/388* (2013.01); *C08G 18/3876* (2013.01); *C08G 18/755* (2013.01); *C08L 75/04* (2013.01); *G02B 1/04* (2013.01); *G02C 7/02* (2013.01)

(58) Field of Classification Search
CPC . C08K 5/521; G02B 1/04; G02C 7/02; B29D 11/00442
See application file for complete search history.

(56) References Cited
U.S. PATENT DOCUMENTS

| 5,635,580 | A | 6/1997 | Kosaka et al. |
| 5,744,568 | A | 4/1998 | Kosaka et al. |
| 6,274,694 | B1 | 8/2001 | Kosaka et al. |
| 9,052,436 | B2 | 6/2015 | Jang et al. |
| 2009/0099329 | A1* | 4/2009 | Ryu .................. C08G 18/3876 528/60 |
| 2013/0303721 | A1* | 11/2013 | Jang ................... C08G 18/3876 528/59 |
| 2014/0039145 | A1* | 2/2014 | Jang ........................ G02B 1/04 528/67 |
| 2014/0107314 | A1* | 4/2014 | Kawato ............. C08G 18/7642 528/226 |
| 2014/0296431 | A1 | 10/2014 | Kousaka |

(Continued)

FOREIGN PATENT DOCUMENTS

| CN | 101228202 A | 7/2008 |
| JP | 03-281312 A | 12/1991 |

(Continued)

OTHER PUBLICATIONS

International Search Report (PCT/ISA/210) dated Jun. 23, 2015, by the Japan Patent Office as the International Searching Authority for International Application No. PCT/JP2015/062933.
Written Opinion (PCT/ISA/237) dated Jun. 23, 2015, by the Japan Patent Office as the International Searching Authority for International Application No. PCT/JP2015/062933.
Extended Search Report issued by the European Patent Office in corresponding European Patent Application No. 15785524.8-1302 dated Sep. 18, 2017 (7 pages).

(Continued)

*Primary Examiner* — Robert Harlan
(74) *Attorney, Agent, or Firm* — Buchanan, Ingersoll & Rooney PC

(57) ABSTRACT

Provided is a polymerizable composition for an optical material including (A) isocyanates having two or more isocyanato groups, which include at least an isophorone diisocyanate, (B) at least one predetermined thiol having two or more mercapto groups, (C) an acidic phosphoric acid ester represented by General Formula (1), and (D) a tin compound represented by General Formula (2), in which the acidic phosphoric acid ester (C) is contained in an amount of 0.05 parts by weight to 0.9 parts by weight, with respect to a total of 100 parts by weight of the isocyanates (A) and the thiols (B), and the tin compound (D) is contained in such an amount that the content of tin is 0.05 parts by weight to 0.3 parts by weight, with respect to a total of 100 parts by weight of the isocyanates (A) and the thiols (B).

$$\left[ R^1 \underset{R^2}{\overset{R^3}{-}} \left( O \underset{}{\overset{}{-}} \right)_n O \underset{}{\overset{}{-}} \right]_m \overset{O}{\underset{}{\overset{\parallel}{P}}} (OH)_{3-m} \quad (1)$$

$$(R^4)_c - Sn - X_{4-c} \quad (2)$$

13 Claims, No Drawings

(56) References Cited

U.S. PATENT DOCUMENTS

2015/0177416 A1 6/2015 Ryu
2017/0002176 A1* 1/2017 Kadowaki .......... C08G 18/4833

FOREIGN PATENT DOCUMENTS

| JP | 07-104101 A | 4/1995 |
|----|----|----|
| JP | 07-118357 A | 5/1995 |
| JP | 07-247335 A | 9/1995 |
| JP | 10-062601 A | 3/1998 |
| JP | 10-082901 A | 3/1998 |
| JP | 10-090501 A | 4/1998 |
| JP | 2000-281687 A | 10/2000 |
| JP | 2002-121379 A | 4/2002 |
| JP | 2014-502657 A | 2/2014 |
| JP | 2014-508207 A | 4/2014 |
| WO | WO 2012/176439 A1 | 12/2012 |
| WO | WO 2013/032010 A1 | 3/2013 |
| WO | WO 2014/002844 A1 | 1/2014 |

OTHER PUBLICATIONS

Office Action issued by the Chinese Patent Office in corresponding Chinese Patent Application No. 201580022450.3 dated Apr. 4, 2018 (12 pages).

* cited by examiner

POLYMERIZABLE COMPOSITION FOR OPTICAL MATERIAL, OPTICAL MATERIAL PRODUCED FROM SAME, AND PROCESS FOR PRODUCING SAME

TECHNICAL FIELD

The present invention relates to a polymerizable composition for an optical material which provides a polythiourethane molded product, an optical material produced from the same, and a process for producing the same.

BACKGROUND ART

Plastic lenses are lightweight, less fragile and dyeable, as compared with inorganic lenses. For these reasons, plastic lenses have rapidly spread in optical elements such as eyeglass lenses and camera lenses. A variety of resins for eyeglass lenses have heretofore been developed and used. Representative examples among them are allyl resins obtained from diethylene glycol bis-allyl carbonates and diallyl isophthalates, (meth)acrylic resins obtained from (meth)acrylates, and polythiourethane resins obtained from isocyanates and thiols.

Among them, a polythiourethane-based resin obtained from isophorone diisocyanate is lightweight and also exhibits a high refractive index, low dispersion and excellent transparency, and therefore it is very useful as a material for plastic lenses.

Patent Document 1 discloses that a polythiourethane-based plastic lens having excellent impact resistance, a high refractive index, low dispersion, and a low specific gravity is obtained by addition of a specific third component to isophorone diisocyanate and 4-mercaptomethyl-1,8-dimercapto-3,6-dithiaoctane.

Patent Document 2 discloses that a lens having good optical properties, a low specific gravity, and excellent impact resistance is obtained from a composition containing dicyclohexylmethane diisocyanate and 4-mercaptomethyl-1,8-dimercapto-3,6-dithiaoctane.

Patent Document 3 discloses the use of a heat-treated phosphoric acid ester in order to prevent white turbidity, since when formulating a catalyst master batch into which a phosphoric acid ester-based releasing agent is blended, there may be a case where the master batch becomes cloudy due to the lot number of the phosphoric acid ester-based release agent.

Patent Document 4 discloses a method of inhibiting the modification of a polyisocyanate compound by mixing the polyisocyanate compound with an acidic phosphoric acid ester, and then adding a polythiol and an alkyltin halide polymerization catalyst to prepare a composition, since the addition of the alkyltin halide to the polyisocyanate compound leads to some cases where the polyisocyanate may be modified by moisture, when obtaining a polythiourethane-based plastic lens obtained from a polyisocyanate and a polythiol.

Patent Document 5 discloses a process for producing a polyurethane lens, including step of casting and polymerizing a mixture containing a polyisocyanate, a polythiol, and a specific phosphoric acid diester into a mold for producing a plastic lens. Example 3 describes obtaining a polyurethane lens from a composition containing a mixture of isophorone diisocyanate, pentaerythritol tetrakismercaptopropionate, monobutoxyethyl acid phosphate and di(butoxyethyl) acid phosphate, and dimethyltin dichloride. The Examples therein have confirmed the impact resistance of the thus obtained polyurethane lens by a method that meets the US FDA standard: Drop Ball Test: test using a 16.3 g steel ball dropping from a height of 127 cm onto a lens surface).

Patent Documents 6 to 9 disclose a process for producing a polyurethane lens, including step of preparing a polyisocyanate compound and two or more polythiol compounds having a different reaction rate with the polyisocyanate compound, step of adding a predetermined alkyltin halide compound to the polyisocyanate compound, and step of mixing and reacting the polyisocyanate compound and the two or more polythiol compounds with the predetermined alkyltin halide compound to obtain a polyurethane lens.

The Examples in these documents disclose obtaining a polyurethane lens from compositions containing a mixture of isophorone diisocyanate, pentaerythritol tetrakismercaptoacetate, dimercaptomethyl dithiane, dimethyltin dichloride, dibutoxyethyl acid phosphate, and butoxyethyl acid phosphate.

RELATED DOCUMENTS

Patent Documents

[Patent Document 1] Japanese Laid-open Patent Publication No. H07-247335
[Patent Document 2] Japanese Laid-open Patent Publication No. H07-118357
[Patent Document 3] Japanese Laid-open Patent Publication No. 2002-121379
[Patent Document 4] Pamphlet of International Publication No. WO 2013/032010
[Patent Document 5] Japanese Laid-open Patent Publication No. H03-281312
[Patent Document 6] Japanese Laid-open Patent Publication No. H07-104101
[Patent Document 7] Japanese Laid-open Patent Publication No. H10-62601
[Patent Document 8] Japanese Laid-open Patent Publication No. H10-82901
[Patent Document 9] Japanese Laid-open Patent Publication No. H10-90501

SUMMARY OF THE INVENTION

Polythiourethane-based optical materials obtained by using isophorone diisocyanate are lightweight and also exhibit a high refractive index, low dispersion and excellent transparency, but have tended to be inferior in impact resistance, as compared with polythiourethane-based optical materials obtained from other isocyanates.

Further, in the case of adding a tin compound as a polymerization catalyst, isophorone diisocyanate is readily susceptible to the modification thereof (generation of a gel-like substance) as compared with other isocyanates, and therefore a polymerizable composition cannot be stably obtained and furthermore there are cases where a product yield is reduced.

The present invention has been made in view of the technical problems of the related art as described above, and an object of the present invention is to provide a polymerizable composition for an optical material with which a polythiourethane molded product having excellent heat resistance, excellent transparency, a high refractive index, low dispersion and a low specific gravity, as well as excellent impact resistance is obtained, and a production method by which the same composition can be stably obtained.

The present inventors have conducted extensive studies and consequently have completed the present invention. The present invention can be illustrated as follows.

[1] A polymerizable composition for an optical material, including:

(A) isocyanates having two or more isocyanato groups, which include at least an isophorone diisocyanate, (B) one or more thiols having two or more mercapto groups, (C) an acidic phosphoric acid ester represented by General Formula (1),

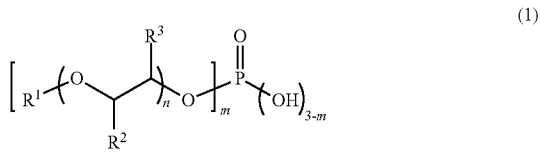

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group), and (D) a tin compound represented by General Formula (2),

(2)

wherein, in General Formula (2), $R^4$ represents an alkyl group having 1 to 4 carbon atoms, X represents a fluorine atom, a chlorine atom, a bromine atom or —O—C(=O)—$R^5$ in which $R^5$ represents an alkyl group having 1 to 11 carbon atoms, and c represents an integer of 1 to 3, wherein the acidic phosphoric acid ester (C) is contained in an amount of 0.05 parts by weight to 0.9 parts by weight, with respect to a total of 100 parts by weight of the isocyanates (A) and the thiols (B), the tin compound (D) is contained in such an amount that the content of tin is 0.05 parts by weight to 0.3 parts by weight, with respect to a total of 100 parts by weight of the isocyanates (A) and the thiols (B), and the thiols (B) include at least one selected from bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

[2] The polymerizable composition for an optical material according to [1], in which the isocyanates (A) include at least one selected from an aliphatic isocyanate, an aromatic isocyanate, a heterocyclic isocyanate, and an alicyclic isocyanate, in addition to the isophorone diisocyanate.

[3] The polymerizable composition for an optical material according to [1] or [2], in which the thiols (B) include at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

[4] A molded product obtained by polymerizing and curing the polymerizable composition for an optical material according to any one of [1] to [3].

[5] An optical material comprised of the molded product according to [4].

[6] A plastic eyeglass lens comprised of the molded product according to [4].

[7] A process for producing a polymerizable composition for an optical material, including a step of preparing a composition including:

(A) isocyanates having two or more isocyanato groups, which include at least an isophorone diisocyanate, (B) one or more thiols having two or more mercapto groups, (C) an acidic phosphoric acid ester represented by General Formula (1) in an amount of 0.05 parts by weight to 0.9 parts by weight, with respect to a total of 100 parts by weight of the isocyanates (A) and the thiols (B),

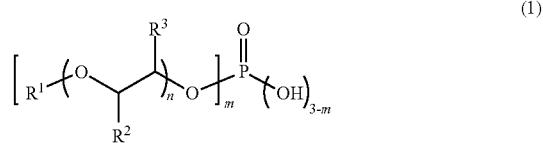

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group, and (D) a tin compound represented by General Formula (2) in which an amount of tin is 0.05 parts by weight to 0.3 parts by weight, with respect to a total of 100 parts by weight of the isocyanates (A) and the thiols (B),

(2)

wherein, in General Formula (2), $R^4$ represents an alkyl group having 1 to 4 carbon atoms, X represents a fluorine atom, a chlorine atom, a bromine atom or —O—C(=O)—$R^5$ in which $R^5$ represents an alkyl group having 1 to 11 carbon atoms, and c represents an integer of 1 to 3, wherein the thiols (B) include at least one selected from bis(mercaptoethyl) sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

[8] The process for producing a polymerizable composition for an optical material according to [7], in which the step of preparing a composition includes a step of mixing the isocyanates (A) and the tin compound (D) in the presence of 32 parts by weight or more of the acidic phosphoric acid ester (C), with respect to 100 parts by weight of tin contained in the tin compound (D), and a step of mixing the resulting mixture with the remaining necessary amount of the acid phosphoric acid ester (C) if desired, and the thiols (B).

[9] The process for producing a polymerizable composition for an optical material according to [7], in which the step of preparing a composition includes a step of mixing the thiols (B) and the tin compound (D), and a step of mixing the resulting mixture with the isocyanates (A), and the acidic phosphoric acid ester (C).

[10] The process for producing a polymerizable composition for an optical material according to [7], in which the step of preparing a composition includes a step of mixing the isocyanates (A) and the thiols (B), and a step of mixing the resulting mixture with the acidic phosphoric acid ester (C), and the tin compound (D).

[11] The process for producing a polymerizable composition for an optical material according to any one of [7] to [10], in which the isocyanates (A) include at least one selected from an aliphatic isocyanate, an aromatic isocyanate, a heterocyclic isocyanate, and an alicyclic isocyanate, in addition to the isophorone diisocyanate.

[12] The process for producing a polymerizable composition for an optical material according to any one of [7] to [11], in which the thiols (B) include at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

[13] A process for producing a plastic eyeglass lens, including:

a step of obtaining a polymerizable composition for an optical material by the method according to any one of [7] to [12], a step of injecting the polymerizable composition for an optical material into a lens casting mold, and a step of polymerizing the polymerizable composition for an optical material.

According to the polymerizable composition for an optical material of the present invention, it is possible to obtain a polythiourethane molded product having excellent heat resistance, excellent transparency, a high refractive index, low dispersion and a low specific gravity, as well as excellent impact resistance, and exhibiting an excellent balance between these properties.

Further, according to the process for producing a polymerizable composition for an optical material of the present invention, the composition can be stably obtained and further a product yield is improved, since the modification of isophorone diisocyanate is inhibited.

DESCRIPTION OF EMBODIMENTS

Hereinafter, the polymerizable composition for an optical material according to the present invention will be explained with reference to embodiments.

A polymerizable composition for an optical material according to the present embodiment includes:

(A) isocyanates having two or more isocyanato groups, which include at least an isophorone diisocyanate, (B) one or more thiols having two or more mercapto groups, (C) an acidic phosphoric acid ester represented by the following General Formula (1), $$\left[ R^1 + O + \underset{R^2}{\overset{R^3}{\underset{|}{C}}} \right]_n O \underset{}{\overset{}{\underset{}{\overset{O}{\underset{||}{P}}}}} (OH)_{3-m}$$ (1)

In General Formula (1), m represents an integer of 1 or 2, n represents an integer of 0 to 18, $R^1$ represents an alkyl group having 1 to 20 carbon atoms, and $R^2$ and $R^3$ each independently represents a hydrogen atom, a methyl group, or an ethyl group.

(D) a tin compound represented by the following General Formula (2), $$(R^4)_c-Sn-X_{4-c}$$ (2)

In General Formula (2), $R^4$ represents an alkyl group having 1 to 4 carbon atoms, X represents a fluorine atom, a chlorine atom, a bromine atom or $-O-C(=O)-R^5$ in which $R^5$ represents an alkyl group having 1 to 11 carbon atoms, and c represents an integer of 1 to 3.

The polymerizable composition for an optical material contains the acidic phosphoric acid ester (C) in an amount of 0.05 parts by weight to 0.9 parts by weight, and the tin compound (D) in such an amount that the content of tin is 0.05 parts by weight to 0.3 parts by weight, with respect to a total of 100 parts by weight of the isocyanates (A) and the thiols (B).

Hereinafter, individual components will be described.

[Isocyanates (A)]

The isocyanates (A) have two or more isocyanato groups, which include at least an isophorone diisocyanate.

The isophorone diisocyanate may include a dimer, a trimer, and a prepolymer.

In the present embodiment, the isocyanates (A) may be a isophorone diisocyanate alone, or a combination of isophorone diisocyanate with one or more of other isocyanates having two or more isocyanato groups (hereinafter, simply referred to as isocyanate (a)). Examples of such an isocyanate (a) include an alicyclic isocyanate, an aliphatic isocyanate, an aromatic isocyanate, and a heterocyclic isocyanate and the like, and at least one of which may be used.

Examples of the alicyclic isocyanate include bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane and the like, and at least one of which may be used.

Examples of the aliphatic isocyanate include hexamethylene diisocyanate, 2,2,4-trimethylhexamethylene diisocyanate, 2,4,4-trimethylhexamethylene diisocyanate, pentamethylene diisocyanate, lysine diisocyanatomethyl ester, lysine triisocyanate, m-xylylene diisocyanate, α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane and the like, and at least one of which may be used.

Examples of the aromatic isocyanate include tolylene diisocyanate, 4,4'-diphenylmethane diisocyanate, and phenylene diisocyanate and the like, and the tolylene diisocyanate is one or more isocyanates selected from 2,4-tolylene diisocyanate and 2,6-tolylene diisocyanate. Examples of the tolylene diisocyanate include 2,4-tolylene diisocyanate, 2,6-tolylene diisocyanate, and a mixture of 2,4-tolylene diisocyanate and 2,6-tolylene diisocyanate and the like, and at least one of which may be used.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)

tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane and the like, and at least one of which may be used.

The isocyanate (a) to be used in combination with isophorone diisocyanate may include a dimer, a trimer, and a prepolymer.

[Thiols (B)]

The thiols (B) are one or more thiols having two or more mercapto groups, preferably two or more functional polythiol compounds having one or more sulfide bonds and/or one or more ester bonds, and may be one compound or a mixture of two or more compounds.

Specific examples of the thiols (B) include a two or more functional thiol (b1) having one or more sulfide bonds (hereinafter, sometimes abbreviated as "thiol (b1)")

a two or more functional thiol (b2) having one or more ester bonds (hereinafter, sometimes abbreviated as "thiol (b2)"), and a two or more functional thiol (b3) having one or more ester bonds and one or more sulfide bonds (hereinafter, sometimes abbreviated as "thiol (b3)").

Examples of the thiols (B) include one or more compounds selected from compounds falling within any one of thiols (b1) to (b3), one or more compounds selected from compounds falling within any two of thiols (b1) to (b3), and one or more compounds selected from compounds falling within thiols (b1) to (b3).

In the present embodiment, the thiols (B) that can be used are preferably one or more selected from the thiol (b1) and the thiol (b2), and more preferably a compound selected only from the thiol (b1), or a combination of one or more compounds selected from compounds falling within the thiol (b1) and one or more compounds selected from compounds falling within the thiol (b2).

The thiol (b1) is a compound having one or more sulfide bonds and two or more SH groups.

Specific examples of the thiol (b1) include 4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethyl)methane, bis(mercaptomethyl)sulfide, 2,5-bis(mercaptomethyl)-1,4-dithiane, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, tetrakis(mercaptomethylthiomethyl)methane, tetrakis(2-mercaptoethylthiomethyl)methane, bis(2,3-dimercaptopropyl)sulfide, 1,1,2,2-tetrakis(mercaptomethylthio)ethane, and 3-mercaptomethyl-1,5-dimercapto-2,4-dithiapentane and the like, and at least one of which may be used.

In the present embodiment, it is preferable to use at least one selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, bis(mercaptoethyl)sulfide, 2,5-bis(mercaptomethyl)-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, and 3-mercaptomethyl-1,5-dimercapto-2,4-dithiapentane as the thiol (b1).

The thiol (b2) is a compound having one or more ester bonds and two or more SH groups.

Specific examples of the thiol (b2) include 2,3-dimercapto-1-propanol (3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), pentaerythritol bis(3-mercaptopropionate), pentaerythritol tris(3-mercaptopropionate), glycerine tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethyl sulfide bis(2-mercaptoacetate), hydroxymethyl sulfide bis(3-mercaptopropionate), thioglycolic acid bis(2-mercaptoethyl ester), thiodipropionic acid bis(2-mercaptoethyl ester), hydroxyethyl sulfide (2-mercaptoacetate), hydroxyethyl sulfide (3-mercaptopropionate), and a polythiol compound represented by the following General Formula (3) and the like.

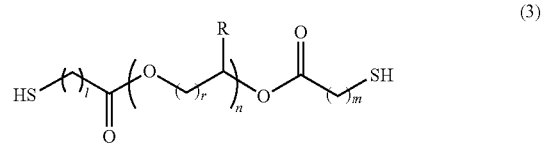

(3)

In the formula, l, m, and r each independently represent an integer of 1 to 4, and n represents an integer of 1 to 3. R represents hydrogen or a methyl group, and in the case where R is present in plurality, R's may be the same or different, respectively. It is preferred that l and m each independently represent an integer of 1 to 2, r represents an integer of 1 to 3, and n is 1 or 2.

The polythiol compound represented by General Formula (3) is a condensate of ethylene glycol, diethylene glycol, triethylene glycol, propylene glycol and mercaptoalkyl carboxylic acid, and specific examples thereof include ethylene glycol bis(mercaptoacetate), ethylene glycol bis(mercaptopropionate), ethylene glycol bis(mercaptobutyrate), diethylene glycol bis(mercaptoacetate), diethylene glycol bis(mercaptopropionate), diethylene glycol bis(mercaptobutyrate), triethylene glycol bis(mercaptoacetate), triethylene glycol bis(mercaptopropionate), triethylene glycol bis(mercaptobutyrate), and 1,4-butanediol bis(3-mercaptopropionate). These compounds may be used alone or in combination of two or more thereof.

Diethylene glycol bis(mercaptopropionate) or 1,4-butanediol bis(3-mercaptopropionate) may be preferably used as the polythiol compound represented by General Formula (3).

The thiol (b2) is preferably at least one selected from the group consisting of polythiol compounds represented by General Formula (3).

In the present embodiment, 1,4-butanediol bis(3-mercaptopropionate) may be more preferably used as the thiol (b2).

The thiol (b3) is a compound having one or more ester bonds and one or more sulfide bonds, and two or more SH groups.

Specific examples of the thiol (b3) include 2,2'-thiodiethanol bis(2-mercaptoacetate), 2,2'-thiodiethanol bis(3-mercaptopropionate), thiodimethanol bis(2-mercaptoacetate), and thiodimethanol bis(3-mercaptopropionate) and the like. These compounds may be used alone or in combination of two or more thereof.

As the thiols (B), it is preferred to include at least one selected from bis(mercaptoethyl)sulfide, 4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane, it is more preferred to include at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, which are a two or more functional thiol having one or more sulfide bonds (b1), and it is particularly preferred to include a 4-mercaptomethyl-1,8-dimercapto-3,6-dithiaoctane.

In a case of containing a two or more functional thiol having one or more sulfide bonds (b1) as the thiols (B), particularly a 4-mercaptomethyl-1,8-dimercapto-3,6-dithiaoctane, there has been room for improvement in strength (impact resistance) even though a refractive index is high, as compared with a two or more functional thiol (b2) having one or more ester bonds.

Furthermore, polythiourethane-based optical materials obtained by using isophorone diisocyanate and the thiol (b1) such as 4-mercaptomethyl-1,8-dimercapto-3,6-dithiaoctane are lightweight and also exhibit a high refractive index, low dispersion and excellent transparency, but have tended to be inferior in impact resistance, as compared with polythiourethane-based optical materials obtained from a combination with other thiols. Meanwhile, the thiol (b1) such as 4-mercaptomethyl-1,8-dimercapto-3,6-dithiaoctane enables to lower the water absorption of the prepared polythiourethane resin when compared with a two or more functional thiol (b2) having one or more ester bonds. Therefore, in a case where a plastic eyeglass lens is prepared using a polyurethane resin, it is advantageous in that surface deformation of a lens takes place hardly.

Preferred embodiments of the present invention have been made in view of such circumstances. Therefore, by combining the isocyanates (A) including isophorone diisocyanate and the thiol (b1) including 4-mercaptomethyl-1,8-dimercapto-3,6-dithiaoctane, and also using the acidic phosphoric acid ester (C) and the tin compound (D) in predetermined amounts, it is possible to preferably obtain a polythiourethane molded product having improved impact resistance, excellent heat resistance, excellent transparency, low dispersion, and a low specific gravity while maintaining a high refractive index, and exhibiting an excellent balance between these properties, particularly an optical material which is used as an eyeglass lens.

In the present embodiment, the molar ratio of isocyanato groups of the isocyanates (A) with respect to mercapto groups of the thiols (B) is in the range of 0.8 to 1.2, preferably in the range of 0.85 to 1.2, and still more preferably in the range of 0.9 to 1.2.

If the molar ratio is within the above-specified range, it is possible to preferably obtain a polythiourethane molded product having excellent heat resistance, excellent transparency, a high refractive index, low dispersion and a low specific gravity as well as excellent impact resistance, and exhibiting an excellent balance between these properties, particularly an optical material which is used as an eyeglass lens.

[Acidic Phosphoric Acid Ester (C)]

The acidic phosphoric acid ester (C) may be represented by General Formula (1).

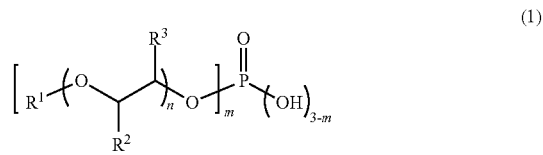

(1)

In General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group. The number of carbon atoms in [ ]m is preferably 4 to 20.

Examples of $R^1$ in General Formula (1) include an organic residue derived from a linear aliphatic compound such as a methane, ethane, propane, butane, pentane, hexane, heptane, octane, nonane, decane, undecane, dodecane, tetradecane, or hexadecane; an organic residue derived from a branched aliphatic compound such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, or 4-propyloctane; and an organic residue derived from an alicyclic compound such as cyclopentane, cyclohexane, 1,2-dimethylcyclohexane, 1,3-dimethylcyclohexane, or 1,4-dimethylcyclohexane, and at least one selected from these residues may be used. Incidentally, it is not intended to be limited to these exemplified compounds. At least one compound or a mixture of two or more compounds may be used as the acidic phosphoric acid ester (C).

In General Formula (1), n is preferably 0 or 1.

In the case where n is 0, $R^1$ is preferably a linear or branched alkyl group having 4 to 12 carbon atoms, and more preferably a linear alkyl group having 8 to 12 carbon atoms.

In the case where n is 1, $R^1$ is preferably a linear or branched alkyl group having 1 to 20 carbon atoms, and preferably a linear or branched alkyl group having 3 to 12 carbon atoms.

One compound or a mixture of two or more compounds selected from these compounds may be used as the acidic phosphoric acid ester (C).

Zelec UN (manufactured by STEPAN Corporation), an internal release agent for MR (manufactured by Mitsui Chemicals, Inc.), JP series (manufactured by JOHOKU Chemical Co., Ltd.), PHOSPHANOL series (manufactured by TOHO Chemical Industry Co., Ltd.), AP series and DP series (manufactured by DAIHACHI Chemical Industry Co., Ltd.), and the like may be used as the acidic phosphoric acid ester (C). More preferred are Zelec UN (manufactured by STEPAN Corporation), and an internal release agent for MR (manufactured by Mitsui Chemicals, Inc.).

[Tin Compound (D)]

The tin compound (D) is represented by General Formula (2).

$$(R^4)_c—Sn—X_{4-c} \quad (2)$$

In General Formula (2), $R^4$ represents an alkyl group having 1 to 4 carbon atoms. X represents a fluorine atom, a chlorine atom, a bromine atom or —O—C(=O)—$R^5$, and is preferably a chlorine atom. $R^5$ represents an alkyl group having 1 to 11 carbon atoms, and c is an integer of 1 to 3.

Examples of the tin compound (D) include dialkyltin halides such as dibutyltin dichloride and dimethyltin dichloride, and dialkyltin dicarboxylates such as dimethyltin diacetate, dibutyltin dioctanoate and dibutyltin dilaurate.

The dialkyltin halides may include monoalkyltin halides and trialkyltin halides. The dialkyltin dicarboxylates may include monoalkyltin tricarboxylated products and trialkyltin carboxylated products.

Among these, dialkyltin halides are preferred, dialkyltin halides having a C1-C4 alkyl group are preferred, and specific examples thereof are dibutyltin dichloride and dimethyltin dichloride.

[Components Other than Components (A) to (D)]

The polymerizable composition for an optical material according to the present embodiment may include one or more resin modifiers other than the urethane-forming ingredients, such as an active hydrogen compound represented by alcohol, hydroxythiol, amine or the like, an epoxy compound, a thioepoxy compound, an olefin compound, a carbonate compound, an ester compound, a metal, a metal oxide and fine particles thereof, for example organo-modified metal (oxide) fine particles, an organic metal compound, and an inorganic material, in addition to the above-mentioned (A), (B), (C) and (D), for the purpose of improving physical properties, operability, polymerization reactivity and the like of the resulting polythiourethane molded product.

Further, the polymerizable composition for an optical material according to the present embodiment may contain various additives such as a chain extender, a crosslinking agent, a light stabilizer, a ultraviolet absorber, an antioxidant, an oil-soluble dye, a filler, and a bluing agent, depending on the purpose, in the same manner as in known molding methods.

The ultraviolet absorber may include a triazine-based compound, a benzophenone-based compound, and a benzoate-based compound. The above-mentioned resin modifiers and additives may be appropriately added at the stage of producing a polymerizable composition for an optical material.

The polymerizable composition for an optical material according to the present embodiment may contain the acidic phosphoric acid ester (C) in an amount of 0.05 parts by weight to 0.9 parts by weight, preferably 0.05 parts by weight to 0.5 parts by weight, and more preferably 0.05 parts by weight to 0.3 parts by weight, with respect to a total of 100 parts by weight of the isocyanates (A) and the thiols (B).

Further, the polymerizable composition for an optical material according to the present embodiment may contain a tin compound (D) such that the amount of tin in the tin compound (D) is 0.05 parts by weight or more, preferably 0.08 parts by weight or more, and still more preferably 0.1 parts by weight or more as a lower limit, and 0.3 parts by weight or less, and preferably 0.22 parts by weight or less as an upper limit, with respect to a total of 100 parts by weight of the isocyanates (A) and the thiols (B).

These numerical ranges may be appropriately combined.

By containing the acidic phosphoric acid ester (C) and the tin compound (D) in the above-specified range, it is possible to obtain a polythiourethane molded product having excellent heat resistance, excellent transparency, a high refractive index, low dispersion and a low specific gravity as well as excellent impact resistance, and exhibiting an excellent balance between these properties. Such a polythiourethane molded product is preferably used, in particular, as an eyeglass lens.

<Process for Producing Polymerizable Composition for Optical Material>

The process for producing a polymerizable composition for an optical material according to the present embodiment will be described with reference to a first embodiment, a second embodiment, and a third embodiment.

First Embodiment

The production method of the present embodiment includes the following steps.

Step a1: The isocyanates (A) and the tin compound (D) are mixed in the presence of 32 parts by weight or more of the acidic phosphoric acid ester (C) with respect to 100 parts by weight of tin contained in the tin compound (D).

Step a2: Subsequently, the resulting mixture was mixed with the acidic phosphoric acid ester (C) if desired, and the thiols (B).

The production method of the present embodiment is to mix the isocyanates (A) and the tin compound (D) in the presence of a predetermined amount of the acidic phosphoric acid ester (C). In this manner, the modification of isophorone diisocyanate is inhibited, whereby the generation of a gel-like substance can be inhibited. The generation of a gel-like substance is confirmed by checking the presence or absence thereof by visual inspection.

Since there may a case where a gel-like substance is generated in the mixed liquid when the tin compound and (D) and isocyanates (A) are mixed, there have been cases where a polymerizable composition for an optical material containing a gel-like substance does not undergo complete polymerization in a polymerization step, or some cases where a molded product with desired physical properties cannot be obtained.

The present inventors have conducted extensive studies and found that the generation of a gel-like substance is inhibited by mixing the isocyanates (A) and the tin compound (D) in the presence of a predetermined amount of the acidic phosphoric acid ester (C), whereby a good thiourethane molded product is obtained, and consequently have completed the present invention.

(Step a1)

Step a1 is to mix the isocyanates (A) and the tin compound (D) in the presence of 32 parts by weight or more, and preferably 46 parts by weight or more of the acidic phosphoric acid ester (C), with respect to 100 parts by weight of tin contained in the tin compound (D). In this manner, the generation of a gel-like substance can be inhibited.

The phosphoric acid ester (C) can be used in an amount to be contained finally in the polymerizable composition for an optical material. Therefore, the upper limit of the phosphoric acid ester (C) in step a1 is the maximum amount of the phosphoric acid ester (C) contained in the polymerizable composition for an optical material.

Specifically, step a1 may include the following two embodiments.

After mixing the isocyanates (A) and the acidic phosphoric acid ester (C), the tin compound (D) is added thereto, followed by mixing.

After mixing the acidic phosphoric acid ester (C) and the tin compound (D), the isocyanates (A) are added thereto, followed by mixing.

Since the tin compound (D) or the acidic phosphoric acid ester (C) is of a small amount as compared to other components, there is a case where weighing and uniform dissolution of the tin compound (D) or the acidic phosphoric acid ester (C) become difficult when mixing and dissolving with other components in step a1. Moreover, a master solution containing the tin compound (D) at a high concentration may be used in view of operational convenience. In this case, it is possible to prepare a solution containing a portion of the necessary amount of the isocyanates (A), the tin compound (D), and all or portion of the necessary amount of the acidic phosphoric acid ester (C). This solution is hereinafter referred to as a master solution (I).

Also when obtaining the master solution (I), the isocyanates (A), the acidic phosphoric acid ester (C), and the tin compound (D) are mixed such that the isocyanates (A) and the tin compound (D) are mixed in the presence of the acidic phosphoric acid ester (C). For example, there is a method of adding a portion of the necessary amount of the isocyanates (A) and all or portion of the necessary amount of the acidic phosphoric acid ester (C), and then adding the tin compound (D) thereto, followed by mixing to obtain the master solution (I), or a method of adding all or portion of the necessary amount of the acidic phosphoric acid ester (C) and the tin compound (D), and then adding a portion of the necessary amount of the isocyanates (A) thereto, followed by mixing to obtain the master solution (I).

The mixing method in step a1 is not particularly limited, and a mixing device, rotational speed, an addition method, an addition rate and mixing time are appropriately selected depending on the volume of a mixed solution to achieve homogeneous mixing. The temperature during the mixing is not particularly limited, but it is preferably 10° C. to 25° C. Further, the mixing is preferably carried out in the presence of an inert gas, for example, in the presence of a nitrogen or argon gas.

(Step a2)

In step a2, the mixed solution obtained in step a1 (including the master solution (I)) is further mixed with the remaining necessary amount of the acidic phosphoric acid ester (C) if desired, and the thiols (B) to obtain a polymerizable composition for an optical material.

In step a2, the remaining necessary amount of the isocyanates (A) may also be added if desired.

The mixing conditions are the same as in step a1, and the addition rate or the like of the acidic phosphoric acid ester (C) and the thiols (B) is also appropriately selected.

The polymerizable composition for an optical material obtained in step a2 contains the acidic phosphoric acid ester (C) in an amount of 0.05 parts by weight to 0.9 parts by weight and the tin compound (D) in an amount of 0.05 parts by weight to 0.3 parts by weight in terms of tin content, with respect to a total of 100 parts by weight of the isocyanates (A) and the thiols (B).

Second Embodiment

The production method of the present embodiment includes the following steps.

Step b1: The thiols (B) and the tin compound (D) are mixed.

Step b2: Subsequently, the resulting mixture is mixed with the isocyanates (A), and the acidic phosphoric acid ester (C).

The generation of a gel-like substance can be inhibited by the production in this addition order.

(Step b1)

Specifically, in step b1, the thiols (B) and the tin compound (D) are mixed. In step b1, the acidic phosphoric acid ester (C) added in step b2 may be added without particular limitation.

Since the tin compound (D) or the acidic phosphoric acid ester (C) is of a small amount as compared to other components, there may be a case where weighing and uniform dissolution of the tin compound (D) or the acidic phosphoric acid ester (C) become difficult when mixing and dissolving with other components. Moreover, a master solution containing the tin compound (D) at a high concentration can be used in view of operational convenience. In this case, a solution containing a portion of the necessary amount of the thiols (B), and the tin compound (D) is prepared. This solution is hereinafter referred to as a master solution (II).

The mixing method in step b1 is not particularly limited, and a mixing device, rotational speed, an addition method, an addition rate and mixing time are appropriately selected depending on the volume of a mixed solution to achieve homogeneous mixing. The temperature during the mixing is not particularly limited, but it is preferably 10° C. to 25° C. Further, the mixing is preferably carried out in the presence of an inert gas, for example, in the presence of a nitrogen or argon gas.

(Step b2)

In step b2, a polymerizable composition for an optical material can be obtained by mixing the mixed solution obtained in step b1 (including the master solution (II)) with the isocyanates (A), and the acidic phosphoric acid ester (C).

The mixing conditions are the same as in step b1, and the addition rate or the like of the isocyanates (A) and the acidic phosphoric acid ester (C) is also appropriately selected.

The polymerizable composition for an optical material obtained in step b2 contains the acidic phosphoric acid ester (C) in an amount of 0.05 parts by weight to 0.9 parts by weight and the tin compound (D) in an amount of 0.05 parts by weight to 0.3 parts by weight in terms of tin content, with respect to a total of 100 parts by weight of the isocyanates (A) and the thiols (B).

Third Embodiment

The production method of the present embodiment includes the following steps.

Step c1: The isocyanates (A) and the thiols (B) are mixed.

Step c2: Subsequently, the acidic phosphoric acid ester (C) and the tin compound (D) are added to the resulting mixture, followed by mixing.

The generation of a gel-like substance can be inhibited by the production in this addition order.

The mixing method in step c1 is not particularly limited, and a mixing device, rotational speed, an addition method, an addition rate and mixing time are appropriately selected depending on the volume of a mixed solution to achieve homogeneous mixing. The temperature during the mixing is not particularly limited, but it is preferably 10° C. to 25° C. Further, the mixing is preferably carried out in the presence of an inert gas, for example, in the presence of a nitrogen or argon gas.

In step c2, a polymerizable composition for an optical material can be obtained by adding the acidic phosphoric acid ester (C) and the tin compound (D) to the mixed solution obtained in step c1, followed by mixing.

The mixing conditions are the same as in step c1, and the addition rate or the like of the acidic phosphoric acid ester (C) and the tin compound (D) is also appropriately selected.

The polymerizable composition for an optical material obtained in step c2 contains the acidic phosphoric acid ester (C) in an amount of 0.05 parts by weight to 0.9 parts by weight and the tin compound (D) in an amount of 0.05 parts by weight to 0.3 parts by weight in terms of tin content, with respect to a total of 100 parts by weight of the isocyanates (A) and the thiols (B).

By polymerizing and curing the thus obtained polymerizable composition for an optical material according to the present embodiment, it is possible to obtain a polythiourethane molded product having excellent impact resistance, excellent heat resistance, a high refractive index, high transparency, low dispersion and a low specific gravity, and exhibiting a balance of these properties.

[Uses]

The polythiourethane molded product according to the present embodiment can be obtained in various shapes by changing a mold during cast polymerization. The polythiourethane molded product according to the present embodiment has high transparency, and can be used for various applications of an optical resin, such as a plastic lens, a camera lens, a light emitting diode (LED), a prism, an optical fiber, an information recording substrate, a filter, and a light emitting diode. In particular, the polythiourethane molded product according to the present embodiment is suitable as an optical material for a plastic eyeglass lens, a camera lens, a light emitting diode, or the like.

Hereinafter, the process for producing a polythiourethane molded product will be described with reference to a process for producing a plastic eyeglass lens.

The process for producing a plastic eyeglass lens according to the present embodiment includes the following steps.

Step d1: The polymerizable composition for an optical material according to the present embodiment is injected into a lens casting mold.

Step d2: The polymerizable composition for an optical material is polymerized.

(Step d1)

In this step, the polymerizable composition for an optical material according to the present embodiment is injected into a casting mold (mold) that is held by a gasket or tape. In this case, it is preferable to carry out a degassing treatment under reduced pressure, or a filtration treatment such as pressurization or depressurization, if desired, depending on physical properties required for the resulting molded product.

(Step d2)

In this step, polymerization of the polymerizable composition for an optical material that has been cast in a molding mold is initiated to polymerize the composition. The polymerization conditions are significantly variable depending on types of the isocyanates (A) and the thiols (B) to be used, shapes of a mold, and the like and therefore are not limited, but the polymerization is carried out at a temperature of about 0° C. to 140° C. for 1 hour to 48 hours.

The plastic eyeglass lens according to the present embodiment may be subjected to a treatment such as annealing, if desired. Although the treatment is carried out at a temperature of usually 50° C. to 150° C., preferably 90° C. to 140° C., and more preferably 100° C. to 130° C.

The plastic eyeglass lens according to the present embodiment may be used with the formation of a coating layer over one side or both sides thereof, if desired. Examples of the coating layer include a primer layer, a hard coat layer, an anti-reflection layer, an anti-fogging coat layer, an anti-fouling layer, and a water-repellent layer and the like. These coating layers may be used alone or as a multilayered structure of plural coating layers. In the case where coating layers are formed over both sides of the eyeglass lens, the same or different coating layers may be formed on each surface.

The plastic eyeglass lens using the polythiourethane molded product according to the present embodiment may be dyed with a dye according to the purpose in order to impart fashionability, photochromicity or the like, and then used. The lens may be dyed using a known dyeing method.

In addition, plastic eyeglass lenses may be stored in a state of being packed for a relatively long period of time, and consequently there may be problems in quality. For example, during the storage of lenses, the damage by scratch, the shape thereof changes due to moisture absorption, or the colors of left and right lenses change and are different from each other due to a difference in the storage period of the lenses.

In this case, such problems may be solved and improved using known packaging techniques (for example, Japanese Laid-open Patent Publication No. 2007-99313, Japanese Laid-open Patent Publication No. 2007-24998, and Japanese Laid-open Patent Publication No. H09-216674).

Specific examples of the packaging techniques include a method of sealing and storing a lens in a packaging material which is formed of a material having properties (gas barrier properties) of suppressing permeation of oxygen or oxygen and water vapor and is filled with an inert gas; a method of sealing and storing a lens in a packaging material which is formed of a material having properties (gas barrier properties) of suppressing permeation of oxygen or oxygen and water vapor together with a deoxygenating agent; and a method of sealing a lens in a vacuum.

Embodiments of the present invention have been described as above, but these are illustrative of the present invention, and various configurations other than the foregoing may be employed.

EXAMPLES

Hereinafter, the present invention will be described specifically by way of Examples.

In a performance test of the resulting molded product, refractive index, Abbe number, impact resistance, specific gravity, gel generation, heat resistance (Tg), and loss degree of transparency were evaluated according to the following test methods.

Refractive index and Abbe number: Measured at 20° C. using a Pulfrich refractometer.

Impact Resistance: According to the US FDA standard, breakage in the lens was tested by dropping 10 steel balls having a different weight of 8.35 g, 16.33 g, 28.13 g, 32.63 g, 44.85 g, 66.82 g, 95.01 g, 111.78 g, 173.58 g, and 225.5 g on the center of a lens having a center thickness of 1.2 mm one by one in the order from the lightest to a heavier one from a height of 127 cm (50 inches). Evaluation was made by performing a test for 10 lenses. The maximum weight of the steel ball at a time point of no generation of breakage in 5 or more lenses was taken as a value of the impact resistance.

Specific gravity: Measured at 20° C. using Archimedes' principle.

Gel generation: Visually inspected in the step of preparing a polymerizable composition.

Heat resistance (Tg): Tg (° C.) in a TMA penetration method (load: 50 g; pinpoint: 0.5 mmφ) by using a THERMOMECHANICAL ANALYZER TMA-60 (manufactured by Shimadzu Corporation) was taken as the heat resistance.

Loss degree of transparency of thiourethane molded product: A circular plate having a thickness of 9 mm and φ75 mm was prepared and subjected to a measurement in a grayscale image apparatus to calculate the loss degree of transparency. When the value of the loss degree of transparency is low, it is determined that the transparency is high.

Reference Example 1

10.0 parts by weight of isophorone diisocyanate were added to 0.20 parts by weight of dimethyltin dichloride (manufactured by Honjo Chemical Corporation, trade name: NESTIN P) and 0.035 parts by weight of acidic phosphoric acid ester (manufactured by STEPAN Corporation, trade name: Zelec UN), followed by mixing with stirring to formulate a master solution (I).

The resulting master solution (I) was stirred at 20° C. for 1 hour, followed by visual inspection of a gel-like substance. There was no generation of a gel-like substance. The results are shown in Table 2.

Reference Example 2

56.1 parts by weight of isophorone diisocyanate were added to 0.20 parts by weight of dimethyltin dichloride (manufactured by Honjo Chemical Corporation, trade name: NESTIN P) and 0.05 parts by weight of acidic phosphoric acid ester (manufactured by STEPAN Corporation, trade name: Zelec UN), followed by mixing with stirring.

The resulting mixture was stirred at 20° C. for 1 hour, followed by visual inspection of a gel-like substance. There was no generation of a gel-like substance. The results are shown in Table 2.

Reference Example 3

10.0 parts by weight of isophorone diisocyanate were added to 0.033 parts by weight of acidic phosphoric acid ester (manufactured by STEPAN Corporation, trade name: Zelec UN) and 0.20 parts by weight of dimethyltin dichloride (manufactured by Honjo Chemical Corporation, trade name: NESTIN P), followed by mixing with stirring to formulate a master solution (I).

The resulting master solution (I) was stirred at 20° C. for 1 hour, followed by visual inspection. The generation of a gel-like substance was confirmed. The results are shown in Table 2.

Reference Example 4

56.1 parts by weight of isophorone diisocyanate were added to 0.020 parts by weight of acidic phosphoric acid ester (manufactured by STEPAN Corporation, trade name: Zelec UN) and 0.20 parts by weight of dimethyltin dichloride (manufactured by Honjo Chemical Corporation, trade name: NESTIN P) in this order, followed by mixing with stirring.

The resulting mixture was stirred at 20° C. for 1 hour, followed by visual inspection. The generation of a gel-like substance was confirmed. The results, are shown in Table 2.

Reference Example 5

50.0 parts by weight of m-xylylene diisocyanate were added to 0.0080 parts by weight of acidic phosphoric acid ester (manufactured by STEPAN Corporation, trade name: Zelec UN) and 0.050 parts by weight of dimethyltin dichloride (manufactured by Honjo Chemical Corporation, trade name: NESTIN P), followed by mixing with stirring.

The resulting mixture was stirred at 20° C. for 1 hour, followed by visual inspection. The generation of a gel-like substance was not observed. The results are shown in Table 2.

Example 1

0.20 parts by weight of dimethyltin dichloride (manufactured by Honjo Chemical Corporation, trade name: NESTIN P), 1.50 parts by weight of 2-(2-hydroxy-5-tert-octylphenyl)-2H-benzotriazole (manufactured by Sakai Chemical Industry Co. Ltd., trade name: VIOSORB583), and 0.10 parts by weight of acidic phosphoric acid ester (manufactured by STEPAN Corporation, trade name: Zelec UN) were added, and then 56.1 parts by weight of isophorone diisocyanate were added thereto, followed by mixing with stirring. In this case, the generation of a gel-like substance was not observed.

Thereafter, 43.9 parts by weight of 4-mercaptomethyl-1,8-dimercapto-3,6-dithiaoctane were mixed thereinto to prepare a polymerizable composition. The resulting polymerization raw material was filtered through a 1.0 μm Teflon (registered trade-mark) filter and degassed for 60 minutes under a vacuum of 400 Pa or lower. The degassed polymerizable composition was injected into a mold consisting of glass molds which are used for molding a lens having a center thickness of 1.2 mm and a tape. This was followed by polymerization in a heating oven at 25° C. to 120° C. for 20 hours, cooling, and then removing the glass molds and the tape to obtain a thiourethane molded product. Annealing was further carried out at 130° C. for 2 hours.

The resulting thiourethane molded product was measured for respective physical properties. The evaluation results are shown in Table 1.

The specific gravity of the resulting thiourethane molded product was 1.23 (20° C.)

Example 2

0.20 parts by weight of dimethyltin dichloride (manufactured by Honjo Chemical Corporation, trade name: NESTIN P) and 0.10 parts by weight of acidic phosphoric acid ester (manufactured by STEPAN Corporation, trade name: Zelec UN) were added, and 10.0 parts by weight of isophorone diisocyanate were added thereto, followed by mixing with stirring to formulate a master solution (I). In this case, the generation of a gel-like substance was not observed.

1.50 parts by weight of 2-(2-hydroxy-5-tert-octylphenyl)-2H-benzotriazole (manufactured by Sakai Chemical Industry Co., Ltd., trade name: VIOSORB583) were added to 46.1 parts by weight of isophorone diisocyanate, followed by mixing with stirring, and then 10.3 parts by weight of the master solution (I) were added thereto, followed by mixing with stirring. Thereafter, 43.9 parts by weight of 4-mercaptomethyl-1,8-dimercapto-3,6-dithiaoctane were mixed thereinto to prepare a polymerizable composition. The resulting polymerization composition was filtered through a 1.0 µm Teflon (registered trade-mark) filter and degassed for 60 minutes under a vacuum of 400 Pa or lower. The degassed polymerizable composition was injected into a mold consisting of glass molds which are used for molding a lens having a center thickness of 1.2 mm and a tape. This was followed by polymerization in a heating oven at 25° C. to 120° C. for 20 hours, cooling, and then removing the glass molds and the tape to obtain a thiourethane molded product. Annealing was further carried out at 130° C. for 2 hours.

The resulting thiourethane molded product was measured for respective physical properties. The evaluation results are shown in Table 1.

Example 3

1.50 parts by weight of 2-(2-hydroxy-5-tert-octylphenyl)-2H-benzotriazole (manufactured by Sakai Chemical Industry Co., Ltd., trade name: VIOSORB583) and 43.9 parts by weight of 4-mercaptomethyl-1,8-dimercapto-3,6-dithiaoctane were mixed in 56.35 parts by weight of the mixed solution (I) prepared in Reference Example 2 to prepare a polymerizable composition. The resulting polymerization raw material was filtered through a 1.0 µm Teflon (registered trade-mark) filter and degassed for 60 minutes under a vacuum of 400 Pa or lower. The degassed polymerizable composition was injected into a mold consisting of glass molds which are used for molding a lens having a center thickness of 1.2 mm and a tape. This was followed by polymerization in a heating oven at 25° C. to 120° C. for 20 hours, cooling, and then removing the glass molds and the tape to obtain a thiourethane molded product. Annealing was further carried out at 130° C. for 2 hours.

The resulting thiourethane molded product was measured for respective physical properties. The evaluation results are shown in Table 1.

Examples 4 to 9

Thiourethane molded products were obtained in the same manner as in Example 1, except that the tin compound and the acidic phosphoric acid ester were changed to those described in Table 1.

The thiourethane molded products obtained in these Examples were measured for respective physical properties. The evaluation results are shown in Table 1.

Example 10

10.23 parts by weight of the master solution (I) prepared in Reference Example 1 were added to a mixed solution in which 1.50 parts by weight of 2-(2-hydroxy-5-tert-octylphenyl)-2H-benzotriazole (manufactured by Sakai Chemical Industry Co., Ltd., trade name: VIOSORB583) and 0.065 parts by weight of acidic phosphoric acid ester (manufactured by STEPAN Corporation, trade name: Zelec UN) were added to 46.1 parts by weight of isophorone diisocyanate, followed by mixing with stirring, and the resulting mixture was further mixed with stirring. Then, 43.9 parts by weight of 4-mercaptomethyl-1,8-dimercapto-3,6-dithiaoctane were mixed thereinto to prepare a polymerizable composition. The resulting polymerizable composition was filtered through a 1.0 µm Teflon (registered trade-mark) filter and degassed for 60 minutes under a vacuum of 400 Pa or lower. The degassed polymerizable composition was injected into a mold consisting of glass molds which are used for molding a lens having a center thickness of 1.2 mm and a tape. This was followed by polymerization in a heating oven at 25° C. to 120° C. for 20 hours, cooling, and then removing the glass molds and the tape to obtain a thiourethane molded product. The molded product was further subjected to annealing at 130° C. for 2 hours. The resulting thiourethane molded product was measured for respective physical properties. The evaluation results are shown in Table 1.

Comparative Example 1

0.35 parts by weight of dibutyltin dichloride (manufactured by Kyodo Chemical Co., Ltd., trade name: KC-1A-1) were mixed with stirring in a mixed solution of 56.1 parts by weight of isophorone diisocyanate and 43.9 parts by weight 4-mercaptomethyl-1,8-dimercapto-3,6-dithiaoctane to prepare a polymerizable composition.

The resulting polymerizable composition was filtered through a 1.0 µm Teflon (registered trade-mark) filter and degassed for 60 minutes under a vacuum of 400 Pa or lower. The degassed polymerizable composition was injected into a mold consisting of glass molds for molding a lens having a center thickness of 1.2 mm, which was subjected to mold-releasing treatment, and a tape. This was followed by polymerization in a heating oven at 25° C. to 120° C. for 20 hours, cooling, and then removing the glass molds and the tape to obtain a thiourethane molded product. Annealing was further carried out at 130° C. for 2 hours.

The resulting thiourethane molded product was measured for respective physical properties. The evaluation results are shown in Table 1.

Comparative Examples 2, 3, 5 and 6 molded products were obtained in the same manner as in Example 1, except that the tin compound and the acidic phosphoric acid ester were changed to those described in Table 1. Further, in Comparative Example 2, isophorone diisocyanate, acidic phosphoric acid ester, and dimethyltin dichloride were mixed, and then the generation of a gel-like substance was investigated.

The molded products obtained in these Comparative Examples were measured for respective physical properties. The evaluation results are shown in Table 1.

Comparative Example 4

10.0 parts by weight of isophorone diisocyanate were added to 0.20 parts by weight of dimethyltin dichloride (manufactured by Honjo Chemical Corporation, trade name: NESTIN P), followed by mixing with stirring to prepare a master solution (I). Because the master solution (I) was gelled, it was determined as unusable.

TABLE 1

| | Tin compound (D) | | | | Acidic phosphoric acid ester (C) | | | | | Thermal properties | | | |
|---|---|---|---|---|---|---|---|---|---|---|---|---|---|
| | DMC | | DBC | | | | | | | | | | |
| | Weight [parts by weight] | Sn weight [parts by weight] | Weight [parts by weight] | Sn weight [parts by weight] | R-1 [parts by weight] | R-2 [parts by weight] | R-3 [parts by weight] | Refractive index $n_e$ | Abbe number Ve | Heat resistance [°C.] | Impact resistance (n = 10) | Loss degree of transparency | Generation of gel |
| Examples | | | | | | | | | | | | | |
| Example 1 | 0.20 | 0.11 | — | — | 0.10 | — | — | 1.60 | 38 | 129 | 225.5 | 21 | No |
| Example 2 | 0.20 | 0.11 | — | — | 0.10 | — | — | 1.60 | 38 | 129 | 225.5 | 21 | No |
| Example 3 | 0.20 | 0.11 | — | — | 0.050 | — | — | 1.60 | 38 | 128 | 225.5 | 21 | No |
| Example 4 | 0.20 | 0.11 | — | — | 0.30 | — | — | 1.60 | 38 | 124 | 225.5 | 26 | No |
| Example 5 | 0.20 | 0.11 | — | — | 0.80 | — | — | 1.60 | 38 | 125 | 111.8 | 24 | No |
| Example 6 | — | — | 0.35 | 0.14 | 0.10 | — | — | 1.60 | 38 | 129 | 225.5 | 24 | No |
| Example 7 | 0.40 | 0.22 | — | — | 0.10 | — | — | 1.60 | 38 | 129 | 173.6 | — | No |
| Example 8 | 0.20 | 0.11 | — | — | — | 0.30 | — | 1.60 | 38 | 129 | 173.6 | — | No |
| Example 9 | 0.20 | 0.11 | — | — | — | — | 0.10 | 1.60 | 38 | 128 | 111.8 | — | No |
| Example 10 | 0.20 | 0.11 | — | — | 0.10 | — | — | 1.60 | 38 | 129 | 225.5 | 21 | No |
| Compara-Ex 1 | — | — | 0.35 | 0.14 | — | — | — | 1.60 | 38 | 133 | 28.1 | 21 | No |
| Compara-Ex 2 | 0.20 | 0.11 | — | — | 0.020 | — | — | 1.60 | 38 | 129 | 32.6 | 20 | Yes |
| Compara-Ex 3 | 0.20 | 0.11 | — | — | 1.00 | — | — | 1.60 | 38 | 126 | 66.8 | 160 | No |
| Compara-Ex 4 | 0.20 | 0.11 | — | — | — | — | — | — | — | Preparation of molded product discontinued due to gelling | | | |
| Compara-Ex 5 | 0.05 | 0.03 | — | — | 0.10 | — | — | 1.60 | 38 | 121 | 95.6 | — | No |
| Compara-Ex 6 | 0.70 | 0.38 | — | — | 0.10 | — | — | 1.60 | 38 | 131 | 66.8 | — | No |

The "Sn weight" and "weight of acidic phosphoric acid ester (C)" are an amount with respect to a total of 100 parts by weight of isocyanates (A) and thiols (B).

TABLE 2

| | Reference Example 1 | Reference Example 2 | Reference Example 3 | Reference Example 4 | Reference Example 5 |
|---|---|---|---|---|---|
| Isocyanates (A) [parts by weight] | (a) 10.0 | (a) 56.1 | (a) 10.0 | (a) 56.1 | (b) 50.0 |
| Tin compound (D) (DMC) Weight [parts by weight] | 0.20 | 0.20 | 0.20 | 0.20 | 0.050 |
| Sn amount [parts by weight] | 0.11 | 0.11 | 0.11 | 0.11 | 0.027 |
| Sn concentration [wt %] relative to isocyanates (A) | 1.1 | 0.2 | 1.1 | 0.2 | 0.1 |
| Acidic phosphoric acid ester (C) (R-1) [parts by weight] | 0.035 | 0.050 | 0.033 | 0.020 | 0.0080 |
| Acidic phosphoric acid ester (C) [parts by weight]/Sn amount in tin compound(D) [parts by weight] | 0.32 | 0.46 | 0.31 | 0.19 | 0.30 |
| Generation of gel | No | No | Yes | Yes | No |

DMC: Dimethyltin dichloride (manufactured by Honjo Chemical Corporation, trade name: NESTIN P)
DBC: Dibutyltin dichloride (manufactured by Kyodo Chemical Co., Ltd., trade name: KC-1A-1)
R-1: Zelec UN (manufactured by STEPAN Corporation)
R-2: Mixture of butoxyethyl acid phosphate monoester and diester (manufactured by Johoku Chemical Co., Ltd., trade name: JP506H)
R-3: Di(2-ethylhexyl) phosphate (manufactured by Tokyo Chemical Industry Co., Ltd.)
(a): Isophorone diisocyanate
(b): m-Xylylene diisocyanate From the results of Examples and Comparative Examples shown in Table 1, it could be seen that when the content of the acidic phosphoric acid ester (C) and the content of tin in the tin compound (D) do not satisfy a predetermined range, a molded product having excellent heat resistance, excellent impact resistance and excellent transparency cannot be obtained. In Comparative Example 4, a molded product was not obtained since a gel-like substance was generated due to the isocyanates (A) and the tin compound (D) being mixed in the absence of other components. In Comparative Example 5, the heat resistance of the resulting molded product was inferior and thereby a balanced molded product was not obtained since a predetermined amount of the tin compound (D) was not added.

Further, from the results of Reference Examples shown in Table 2, it was confirmed that the generation of a gel-like substance is not observed when the isocyanates (A) and the tin compound (D) are mixed in the presence of 32 parts by weight or more of the acidic phosphoric acid ester (C) with respect to 100 parts by weight of tin contained in tin compound (D). It was confirmed that a molded product (Example 3) (Example 10) comprised of the composition obtained by using the master solution of Reference Example 1, and a molded product comprised of the composition obtained by using a mixed solution of Reference Example 2 exhibit excellent heat resistance, excellent impact resistance and excellent transparency by satisfying a predetermined range in terms of content of the acidic phosphoric acid ester (C) and content of tin in the tin compound (D) as described above.

INDUSTRIAL APPLICABILITY

The polymerizable composition for an optical material according to the present invention can be used in the production of optical materials since a polythiourethane molded product having excellent heat resistance, excellent transparency, a high refractive index, low dispersion and a low specific gravity as well as excellent impact resistance, and exhibiting an excellent balance between these properties can be obtained from such a polymerizable composition. Further, the process for producing a polymerizable composition for an optical material according to the present invention allows for stable obtaining of the composition and further improvement of a product yield, and therefore has a high utility value in the production of optical materials.

This application claims priority based on Japanese Patent Application No. 2014-095491 filed on May 2, 2014, the disclosure of which is incorporated herein in its entirety.

The present invention may also employ the following aspects.

[1] A polymerizable composition for an optical material, including:

(A) isocyanates having two or more isocyanato groups, which include at least an isophorone diisocyanate, (B) one or more thiols having two or more mercapto groups, (C) an acidic phosphoric acid ester represented by General Formula (1),

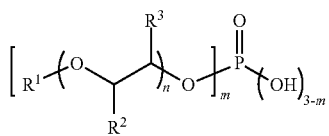

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group, and (D) a tin compound represented by General Formula (2),

(2)

wherein, in General Formula (2), $R^4$ represents an alkyl group having 1 to 4 carbon atoms, X represents a fluorine atom, a chlorine atom, a bromine atom or —O—C(=O)—$R^5$ in which $R^5$ represents an alkyl group having 1 to 11 carbon atoms, and c represents an integer of 1 to 3, wherein the acidic phosphoric acid ester (C) is contained in an amount of 0.05 parts by weight to 0.9 parts by weight, with respect to a total of 100 parts by weight of the isocyanates (A) and the thiols (B), and the tin compound (D) is contained in such an amount that the content of tin is 0.05 parts by weight to 0.3 parts by weight, with respect to a total of 100 parts by weight of the isocyanates (A) and the thiols (B).

[2] The polymerizable composition for an optical material according to [1], in which the isocyanates (A) include at least one selected from an aliphatic isocyanate, an aromatic isocyanate, a heterocyclic isocyanate, and an alicyclic isocyanate, in addition to the isophorone diisocyanate.

[3] The polymerizable composition for an optical material according to [1] or [2], in which the thiols (B) are at least one selected from pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[4] A molded product obtained by polymerizing and curing the polymerizable composition for an optical material according to any one of [1] to [3].

[5] An optical material comprised of the molded product according to [4].

[6] A plastic eyeglass lens comprised of the molded product according to [4].

[7] A process for producing a polymerizable composition for an optical material, including a step of preparing a composition including:

(A) isocyanates having two or more isocyanato groups, which include at least an isophorone diisocyanate, (B) one or more thiols having two or more mercapto groups, (C) an acidic phosphoric acid ester represented by General Formula (1) in an amount of 0.05 parts by weight to 0.9 parts by weight, with respect to a total of 100 parts by weight of the isocyanates (A) and the thiols (B),

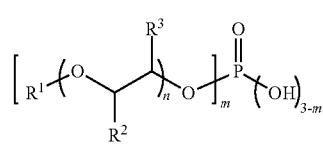

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group, and (D) a tin compound represented by General Formula (2) in which an amount of tin is 0.05 parts by weight to 0.3 parts by weight, with respect to a total of 100 parts by weight of the isocyanates (A) and the thiols (B),

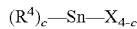

(2)

wherein, in General Formula (2), $R^4$ represents an alkyl group having 1 to 4 carbon atoms, X represents a fluorine atom, a chlorine atom, a bromine atom or —O—C(=O)—$R^5$ in which $R^5$ represents an alkyl group having 1 to 11 carbon atoms, and c represents an integer of 1 to 3.

[8] The process for producing a polymerizable composition for an optical material according to [7], in which the step of preparing a composition includes a step of mixing the isocyanates (A) and the tin compound (D) in the presence of 32 parts by weight or more of the acidic phosphoric acid ester (C), with respect to 100 parts by weight of tin contained in the tin compound (D), and a step of adding and mixing the remaining necessary amount of the acid phosphoric acid ester (C) if desired, and the thiols (B) to the resulting mixture.

[9] The process for producing a polymerizable composition for an optical material according to [7], in which the step of preparing a composition includes a step of mixing the thiols (B) and the tin compound (D), and a step of adding and mixing the isocyanates (A) and the acidic phosphoric acid ester (C) to the resulting mixture.

[10] The process for producing a polymerizable composition for an optical material according to [7], in which the step of preparing a composition includes a step of mixing the isocyanates (A) and the thiols (B), and a step of adding and mixing the acidic phosphoric acid ester (C) and the tin compound (D) to the resulting mixture.

[11] A process for producing a plastic eyeglass lens, including:

a step of obtaining a polymerizable composition for an optical material by the method according to any one of [7] to [10], a step of injecting the polymerizable composition for an optical material into a lens casting mold, and a step of polymerizing the polymerizable composition for an optical material.

The invention claimed is:

1. A polymerizable composition for an optical material, comprising:

(A) isocyanates having two or more isocyanato groups, which include at least an isophorone diisocyanate;

(B) one or more thiols having two or more mercapto groups;

(C) an acidic phosphoric acid ester represented by General Formula (1);

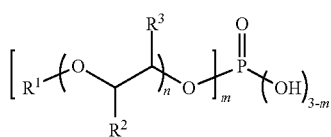

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group; and (D) a tin compound represented by General Formula (2);

(2)

wherein, in General Formula (2), $R^4$ represents an alkyl group having 1 to 4 carbon atoms, X represents a fluorine atom, a chlorine atom, a bromine atom or —O—C(=O)—$R^5$ wherein $R^5$ represents an alkyl group having 1 to 11 carbon atoms, and c represents an integer of 1 to 3, wherein the acidic phosphoric acid ester (C) is contained in an amount of 0.05 parts by weight to 0.9 parts by weight, with respect to a total of 100 parts by weight of the isocyanates (A) and the thiols (B), the tin compound (D) is contained in such an amount that the content of tin is 0.08 parts by weight to 0.3 parts by weight, with respect to a total of 100 parts by weight of the isocyanates (A) and the thiols (B), and the thiols (B) include at least one selected from bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

2. The polymerizable composition for an optical material according to claim 1, wherein the isocyanates (A) include at least one selected from an aliphatic isocyanate, an aromatic isocyanate, a heterocyclic isocyanate, and an alicyclic isocyanate, in addition to the isophorone diisocyanate.

3. The polymerizable composition for an optical material according to claim 1, wherein the thiols (B) include at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

4. A molded product obtained by polymerizing and curing the polymerizable composition for an optical material according to claim 1.

5. An optical material comprised of the molded product according to claim 4.

6. A plastic eyeglass lens comprised of the molded product according to claim 4.

7. A process for producing a polymerizable composition for an optical material, comprising:

a step of preparing a composition including (A) isocyanates having two or more isocyanato groups, which include at least an isophorone diisocyanate, (B) one or more thiols having two or more mercapto groups, (C) an acidic phosphoric acid ester represented by General Formula (1) in an amount of 0.05 parts by weight to 0.9 parts by weight, with respect to a total of 100 parts by weight of the isocyanates (A) and the thiols (B),

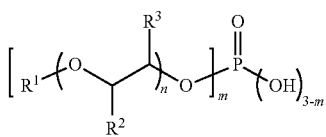

(1)

wherein, in General Formula (1), m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group, and (D) a tin compound represented by General Formula (2) wherein an amount of tin is 0.08 parts by weight to 0.3 parts by weight, with respect to a total of 100 parts by weight of the isocyanates (A) and the thiols (B),

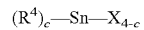

(2)

wherein, in General Formula (2), $R^4$ represents an alkyl group having 1 to 4 carbon atoms, X represents a fluorine atom, a chlorine atom, a bromine atom or —O—C(=O)—$R^5$ wherein $R^5$ represents an alkyl group having 1 to 11 carbon atoms, and c represents an integer of 1 to 3, and wherein the thiols (B) include at least one selected from bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

8. The process for producing a polymerizable composition for an optical material according to claim 7, wherein the step of preparing a composition includes a step of mixing the isocyanates (A) and the tin compound (D) in the presence of 32 parts by weight or more of the acidic phosphoric acid ester (C), with respect to 100 parts by weight of tin contained in the tin compound (D), and a step of mixing the resulting mixture with the remaining necessary amount of the acid phosphoric acid ester (C) if desired, and the thiols (B).

9. The process for producing a polymerizable composition for an optical material according to claim 7, wherein the step of preparing a composition includes a step of mixing the thiols (B) and the tin compound (D), and a step of mixing the resulting mixture with the isocyanates (A), and the acidic phosphoric acid ester (C).

10. The process for producing a polymerizable composition for an optical material according to claim 7, wherein the step of preparing a composition includes a step of mixing the isocyanates (A) and the thiols (B), and a step of mixing the resulting mixture with the acidic phosphoric acid ester (C), and the tin compound (D).

11. The process for producing a polymerizable composition for an optical material according to claim 7, wherein the isocyanates (A) include at least one selected from an aliphatic isocyanate, an aromatic isocyanate, a heterocyclic isocyanate, and an alicyclic isocyanate, in addition to the isophorone diisocyanate.

12. The process for producing a polymerizable composition for an optical material according to claim 7, wherein the thiols (B) include at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

13. A process for producing a plastic eyeglass lens, comprising:

a step of obtaining a polymerizable composition for an optical material by the method according to claim 7;

a step of injecting the polymerizable composition for an optical material into a lens casting mold; and a step of polymerizing the polymerizable composition for an optical material.

* * * * *